3,446,876
PHOSPHONITRILIC COMPOUNDS
David S. Breslow, Madelyn Gardens, Del., assignor to Hercules Incorporated, a corporation of Delaware
No Drawing. Filed Apr. 28, 1966, Ser. No. 545,846
Int. Cl. C07d *105/02*; C07f *9/22*; C08b *27/68*
U.S. Cl. 260—927                                    3 Claims

ABSTRACT OF THE DISCLOSURE

Phenolic substituted phosphonitrilic compounds, and particularly the hexakis (3,5-di-tert-alkyl-4-hydroxyphenoxy)-cyclotriphosphazatrienes and the octakis (3,5-di-tert-alkyl-4-hydroxyphenoxy) cyclotetraphosphazatetraenes are described. The phosphonitrilic compounds, which can be produced by condensing the appropriate phosphonitrilic chloride with, for example, a sodium dialkyl-4-hydroxyphenoxide, are particularly useful as extraction resistant stabilizers for polyolefins.

---

The present invention relates to novel phenolic compounds and more particularly to novel phenolic phosphonitrilic compounds and to their use for the stabilization of polyolefins against oxidative degration.

Highly crystalline, high molecular weight polymers of ethylene, propylene, and higher α-olefins are well known and have many established uses. However, one of the dificiencies of such polymers which must be overcome to enable their use in many applications is poor stability during exposure to oxygen, particularly in the presence of heat.

It is known that polyolefins can be stabilized against the adverse effects of heat by incorporating in such polymers a small amount of certain mono- and bisphenolic antioxidants. Although these phenolic compounds provide some protection for the polyolefins from degradation due to oxygen and heat, they have not proved entirely satisfactory for many end uses which require high temperature aging resistance due to the ease with which they are removed from polymers containing them by volatilization or extraction during use.

Now, in accordance with this invention, it has been discovered that certain phenolic phosphonitrilic compounds having the formula

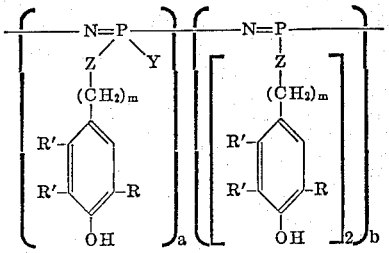

where R is an alkyl radical; one R' is hydrogen and the other R' is an alkyl radical; Z is —O—, —S—, —NH—, or —NR''— and Y is halogen, R''S—, —NH$_2$, R''NH—, or R''$_2$N— where R'' is a univalent hydrocarbon radical; m is 0 to 20; a is 0 to 500; b is 0 to 500; and the sum of a+b is a number from 3 to 500, preferably 3 to 100, and more preferably 3 to 10, possess a significant ability to protect polyolefins against deterioration due to oxygen and heat, and that the protection is retained, even after extensive contact with water. This finding was indeed unexpected since the prior art phenolic antioxidants are ineffective as extraction-resistant oxidation stabilizers for polyolefins.

The invention is particularly useful in stabilizing polyolefins, i.e., homopolymers, copolymers, and terpolymers of ethylene and mono-α-olefins having from 3 to 6 carbon atoms, including, for instance, polyethylene, polypropylene, a poly(butene-1), poly(pentene-1), poly(3-methylbutene-1), and poly(4-methylpenetene-1), copolymers of ethylene and propylene, terpolymers of ethylene, propylene, and dicyclopentadiene, and the like.

The compounds of the present invention are, as stated, phosphonitrilic compounds. In the above formula, R and one R' are alkyl groups which can be alike or different and suitably contain from 1 to 20 carbon atoms. Preferably, R and the R' ortho to the hydroxyl group are tertiary alkyl groups containing from 4 to 9 carbon atoms, and the R' meta to the hydroxyl group is an alkyl group containing 1 to 10 carbon atoms. R'', as stated, is a univalent hydrocarbon radical and can be aliphatic or aromatic. Preferred R'' radicals contain from 1 to 20 carbon atoms and include alkyl, aryl, alkaryl, and aralkyl radicals such as, for example, methyl, ethyl, propyl, butyl, amyl, cyclohexyl, phenyl, tolyl, benzyl, and the like. Preferred halogens which Y can comprise include chlorine, bromine, and iodine. Typical of the phosphonitrilic compounds of the invention are hexakis(3,5-di-tert-butyl-4-hydroxyphenoxy)cyclotriphospha-triene,
hexakis(3,5-di-tert-amyl-4-hydroxyphenoxy)cyclotriphosphazatriene,
hexakis(3,5-di-tert-octyl-4-hydroxyphenoxy)cyclo-triphosphazatriene,
hexakis(3-methyl-5-tert-butyl-4-hydroxyphenoxy)cyclotriphosphazatriene,
hexakis (3,5-di-tert-nonyl-4-hydroxphenoxy)cyclotriphosphazatriene,
hexakis(2-methyl-5-tert-butyl-4-hydroxyphenovy)cyclotriphosphazatriene,
trichloro-tris(3,5-di-tert-butyl-4-hydroxyphenoxy)cyclotriphosphazatriene,
monobromopentakis(3,5-di-tert-butyl-4-hydroxyphenoxy)cyclotriphosphazatriene,
octakis(3,5-di-tert-butyl-4-hydroxyphenoxy)cyclotetraphosphazatetraene,
dichlorohhexakis(3,5-di-tert-butyl-4-hydroxyphenoxy)cyclotetraphosphazatetraene,
octakis(3,5-di-tert-amyl-4-hydroxyphenoxy)cyclotetraphosphazatetraene,
octakis(3-methyl-5-tert-butyl-4-hydroxyphenoxy)cyclotetraphosphazatetraene,
octakis(3,5-di-tert-nonyl-4-hydroxyphenoxy)cyclotetraphosphazatetraene,
octakis(2-methyl-5-tert-butyl-4-hydroxyphenoxy) cyclotetraphosphazatetraene,
bis(laurylthio)hexakis(3,5-di-tert-butyl-4-hydroxyphenoxy)cyclotetraphosphazatetraene,
hexakis(3,5-di-tert-butyl-4-hydroxybenzyloxy)cyclotriphosphazatriene,
hexakis(2-methyl-5-tert-butyl-4-hydroxybenzyloxy)cyclotriphosphazatriene,
octakis(3,5-di-tert-butyl-4-hydroxybenzyloxy)cyclotetraphosphazatetraene,
octakis(2-methyl-5-tert-butyl-4-hydroxybenzyloxy)cyclotetraphosphazatetraene,
tribromo-tris(3,5-di-tert-butyl-4-hydroxybenzyloxy)cyclotriphosphazatriene,
tetrachloro-tetrakis(3,5-di-tert-butyl-4-hydroxybenzyloxy)cyclotetraphosphazatetraene,
hexakis(3,5-di-tert-butyl-4-hydroxyphenylthio)cyclotriphosphazatriene,
hexakis(2-methyl-5-tert-butyl-4-hydroxyphenylthio)cyclotriphosphazatriene,
octakis(3,5-di-tert-butyl-4-hydroxyphenylthio)cyclotetraphosphazatetraene,
octakis(2-methyl-5-tert-butyl-4-hydroxyphenylthio)cyclotetraphosphazatetraene, dichloro-tetrakis(3,5-di-tert-butyl-4-hydroxyphenylthio)-cyclotriphosphazatriene,
tetrakis(dimethylamino)-tetrakis(3,5-di-tert-butyl-4-hydroxyphenylthio)cyclotetraphosphazatetraene,
hexakis(3,5-di-tert-butyl-4-hydroxybenzylthio)cyclotriphosphazatriene,
hexakis(2-methyl-5-tert-butyl-4-hydroxybenzylthio)cyclotriphosphazatriene,
octakis(3,5-di-tert-butyl-4-hydroxybenzylthio)cyclotetraphosphazatetraene,
octakis(2-methyl-5-tert-butyl-4-hydroxybenzylthio)cyclotetraphosphazatetraene,
tris(n-butylamino)-tris(3,5-di-tert-buytl-4-hydroxybenzylthio)cyclotriphosphazatriene,
tetrachloro-tetrakis(3,5-di-tert-butyl-4-hydroxybenzylthio)cyclotetraphosphazatetraene,
hexakis(3,5-di-tert-butyl-4-hydroxyphenylamino)cyclotriphosphazatriene,
hexakis(2-methyl-5-tert-butyl-4-hydroxyphenylamino)cyclotriphosphazatriene,
octakis(3,5-di-tert-butyl-4-hydroxyphenylamino)cyclotetraphosphazatetraene,
octakis(2-methyl-5-tert-butyl-4-hydroxyphenylamino)cyclotetraphosphazatetraene,
trichloro-tris(3,5-di-tert-butyl-4-hydroxyphenylamino)cyclotriphosphazatriene,
monochloro-heptakis(3,5-di-tert-butyl-4-hydroxyphenylamino)cyclotetraphosphazatetraene,
hexakis(3,5-di-tert-butyl-4-hydroxybenzylamino)cyclotriphosphazatriene,
hexakis(2-methyl-5-tert-butyl-4-hydroxybenzylamino)cyclotriphosphazatriene,
octakis(3,5-di-tert-butyl-4-hydroxybenzylamin)cyclotetraphosphazatetraene,
octakis(2-methyl-5-tert-butyl-4-hydroxybenzylamino)cyclotetraphosphazatetraene,
trichloro-tris(3,5-di-tert-butyl-4-hydroxybenzylamino)cyclotriphosphazatriene,
tetrachlorotetrakis(3,5-di-tert-butyl-4-hydroxybenzylamino)cyclotetraphosphazatetraene,
hexakis(3,5-di-tert-butyl-4-hydroxyphenylamino)cyclotriphosphazatriene, phosphonitrilic chloride rubber in which 80% of the chlorine atoms have been replaced by 3,5-di-tert-butyl-4-hydroxyphenoxy groups and 20% by diethylamino groups and the like.

The phenolic substituted phosphonitrilic compounds of this invention can be prepared in known manner, as, for example, by condensing a phosphonitrilic halide, such as the chloride, bromide, or iodide, and particularly the chloride, with the desired alcohol, mercaptan, or amine in the presence or absence of catalyst, such as, for example, copper oxide, copper sulfate, magnesium oxide, magnesium chloride, and the like. A particularly preferred method for preparing the phenoxy substituted phosphonitriles includes condensing a sodium dialkyl-4-hydroxyphenoxide with a phosphonitrilic chloride in a mixture of diethylether and dioxane under strict exclusion of air, the phenoxide being prepared in any desired manner, as, for example, by reacting the dialkylhydroquinone with alcoholic sodium alkoxide according to the method described by G. Natta, Makromolecular Chemie, 70, 191 (1964). The amount of alcohol, mercaptan, or amine employed in the condensation reactions will depend on the number of (N=P halogen$_2$) units in the phosphonitrilic halide and the extent of halogen susbtitution desired. For example, using 1 mole of phosphonitrilic chloride trimer, 6 moles of a hydroquinone derivative are required to give the hexaphenolic-substituted phosphonitrile whereas if it is desirable to retain a certain number of the chlorine atoms in the condensation product, as, for example, for retaining chlorine or for purposes of further substitution by mercapto or amino groups, a smaller amount will be sufficient. The phosphonitrilic halides used as starting are known compounds and can be produced by the classical reaction of ammonium chloride and, for example, phosphorus pentachloride, to produce a mixture of phosphonitrilic chlorides having the formula $(PNCL_2)_n$. The lowest value for n is 3, for the trimer, which is the most usual form. The lower members of this group have been established to have a cyclic structure, and the higher members are thought to be cyclic or linear. The alcohol, mercaptan, and amine derivatives which are condensed with the phosphonitrilic halides, if not readily available, can be produced by known reactions. For example, the alcohols can be readily prepared from the corresponding esters using the lithium aluminum hydride reduction procedure of Nystrom and Brown, J. Am. Chem. Soc. 65, 1466 (1943), the primary amines by conventional reduction of the nitro or nitrile derivatives and the secondary amines by hydrogenation of the corresponding nitrile according to the methods of Brown and Blessing, Ber. Deut. Chem., 56B, 2153 (1923) or Winnans and Adkins, J. Am. Chem. Soc., 54, 307 (1932). The mercapto compounds likewise can be prepared in known manner as by reacting the desired phenol with sulfur chloride and then reducing the diphenyl sulfide with zinc dust in acid medium, or by reacting, for example, p-chloromethyl phenol with thiourea and then hydroloyzing in the presence of caustic.

The stabilizers of this invention can be admixed with the polyolefin by any of the usual procedures for incorporating a stabilizer in a solid material. A simple method is to dissolve the stabilizer in a low boiling solvent such as benzene or pyridine and, after thoroughly mixing the solution with the polymer in flake or other such form, evaporating the solvent; or it can be incorporated by various means of mechanical mixing, etc.

The amount of the phosphonitrilic compound incorporated in the polymer can be varied from a very small stabilizing amount up to several percent. More specifically, beneficial results are normally obtained when it is employed in an amount from about 0.01% to about 5% by weight of the polymer. The optimum amount will usually be between about 0.1% to about 2.5% by weight of the polymer, depending primarily upon the degree of stability desired.

In addition to the phosphonitrilic compound, there can also be present in small amounts other stabilizers which improve the color, light and/or heat stability of the polymer. The stabilizers of this invention can be used, for example, in combination with ultraviolet light absorbers, antacids such as calcium soaps, organic phosphites, organic sulfides which act as peroxide decomposers, and the like, as well as in combination with other materials such as, for example, pigments, dyes, fillers, antistatic agents, etc. Particularly useful materials in this respect are the organic sulfides such as the dialkyl-β-thiodipropionates, the dialkyl monosulfides, the dialkyl disulfides, the thiuram disulfides, the polymeric polythiols, and the polymeric cyclohexylene disulfides. Particularly perferred are poly(cyclohexylene disulfides) of the formula

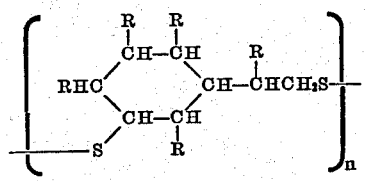

where R is hydrogen or an alkyl radical containing preferably 1 to 18 carbon atoms and $n$ is a number from 5 to 100. Preferred poly(cyclohexylene disulfides) include poly(dipentene disulfide), i.e., the polydisulfide from 1(α-methyl-β-mercaptoethyl)-3-mercapto-4-methylcyclohexane, the polydisulfides from 1-β-mercaptoethyl-3-mercaptocyclohexane, 1-mercaptomethyl-3-mercaptocyclohexane, 1-β-mercaptoethyl-4-mercaptocyclohexane, 1-γ-mercaptopropyl-3-mercaptocyclohexane, 1,4-bis(mercaptomethyl)-cyclohexane, and the like. The poly(cyclohexylene disulfides) can be prepared according to methods known to the art, as, for example, by oxidizing the corresponding dithiol with air according to the method of Marvell and Olson, J. Am. Chem. Soc., 79, 3089 (1957), or with a stoichiometric amount of iodine, bromine, or ferric chloride in the presence of base and a suitable solvent such as benzene. The amount of additional stabilizer which can be incorporated into the polymer will vary from a very small stabilizing amount up to several percent. More specifically, beneficial results are normally obtained when from about 0.01% to about 5% by weight of the polymer of an organic sulfide, and particularly a poly(cyclohexylene disulfide), is used in combination with the phenolic phosphonitrilic compounds of the invention.

The following examples illustrate the preparation of the phosphonitrilic compounds of this invention and the degree of stabilization that is obtained when these compounds are incorporated in a polyolefin. The term "RSV" as used herein denotes reduced specific viscosity, which is the specific viscosity divided by concentration of a 0.1% weight/volume solution of polymer in decahydronaphthalene at 135° C. All parts and percentages are by weight and the percentages are based on the weight of the polymer unless otherwise stated.

Example 1

One and four-tenths (1.4) parts of metallic sodium was dissolved in 55 parts of absolute methanol in a reaction vessel under the complete absence of air. When the reaction had subsided, 13.2 parts of 2,6-di-tert-butyl hydroquinone in 24 parts of methanol was added to the vessel and the solution was boiled at 100° C. to dryness to remove the methanol. Next, 124 parts of dry, freshly distilled dioxane was added to the dry reaction mixture under nitrogen, the temperature was raised to 100° C., and a solution of 3.5 parts of phosphonitrilic chloride trimer in 4 parts of diethyl ether and 15 parts of dioxane was added dropwise over one hour. After refluxing the reaction mixture for one hour, the solution was cooled, diluted with dry petroleum ether, washed with water, dried over magnesium sulfate, and then was evaporated to give a resinous product which was crystallized from a mixture of methanol and water. The precipitate after recrystallization from carbon tetrachloride yielded 3.4 parts of a white powder melting at 201° C. which was identified as hexakis - (3,5 - di - tert - butyl - 4 - hydroxyphenoxy)cyclophosphazatriene.

Example 2

Twenty (20) parts of sodium hydride (54.7%, in mineral oil) was slurried with 200 parts of dry, freshly distilled dioxane at 50° C. in a reaction vessel under the complete absence of air and then 100 parts of 2,6-di-tert-butyl hydroquinone dissolved in 400 parts of dry, freshly distilled dioxane was added dropwise to the reaction vessel. When the reaction had subsided, the temperature was raised to 100° C. and a solution of 26.2 parts of phosphonitrilic chloride trimer in 40 parts of diethyl ether and 115 parts of dioxane was added dropwise over 80 minutes. After refluxing the reaction mixture for 4 hours, the mixture was cooled to room temperature, was allowed to stir overnight, and then was acidified with 100 parts of 10% sulfuric acid added dropwise. The acidified mixture was next diluted with petroleum ether, was washed with water, was dried over sodium sulfate, and then was evaporated to give a light brown solid which, after recrystallization from a mixture of methanol and water, gave 24.67 parts of an almost white powder melting at 205–209° C. Concentration of the recrystallization solvent gave an additional 9 parts of an almost white powder melting at 205–209° C. Both powders were identified as hexakis(3,5-di-tert-butyl-4-hydroxyphenoxy)cyclophosphazatriene which on elemental analysis for $C_{84}H_{126}N_3O_{12}P_3$ gave Theoretical: Carbon, 69.0%; hydrogen, 8.6%; nitrogen, 2.9%. Found: Carbon, 69.5%; hydrogen, 9.3%; nitrogen, 2.9%.

Example 3

A composition was prepared by blending 100 parts of stereoregular polypropylene having a birefringent melting point of about 168° C., an RSV of 3.6, and containing 0.1% of calcium stearate as an antacid with 0.5 part of the hexakis(3,5 - di - tert-butyl-4-hydroxyphenoxy)cyclophosphazatriene prepared in Example 1. The composition was compression molded into 10-mil sheets at a pressure of 1500 p.s.i. using a cycle of 215° C./5 minutes and was then cooled under pressure. The sheets were cut into 3½ x ¾-inch strips and some of the strips were evaluated for stability by exposing in a 140° C. circulating air oven until the first sign of degradation was observed. Other strips were immersed in boiling distilled water for 1 day, dried, and then were exposed in the 140° C. circulating air oven until the first sign of embrittlement. For the sake of comparison, a control composition was also prepared and evaluated as above with the exception that no hexakis(3,5 - di - tert-butyl-4-hydroxyphenoxy)cyclophosphazatriene was used.

Results of the embrittlement tests are tabulated below in Table I.

TABLE I.—EMBRITTLEMENT TIME (DAYS)

| Example No. | Days' immersion in Water prior to heat aging | |
|---|---|---|
| | 0 | 1 |
| 3 | 76 | 84 |
| Control | 1 | 1 |

Examples 4–5

Compositions were prepared by blending 100 parts of the stereoregular polypropylene of Example 3 with, in Example 4, 0.5 part of the hexakis(3,5-di-tert-butyl-4-hydroxyphenoxy)cyclophosphazatriene prepared in Example 2 and with, in Example 5, in addition to 0.5 of the above cyclophosphazatriene, 0.5 part of a poly(dipentene disulfide) having a number average molecular weight of about 3000 and prepared by oxidizing 2,9-p-menthane dithiol with a stoichiometric amount of iodine in the presence of less than an equivalent of potassium hydroxide and benzene. Each composition was extruded into strands which were chilled and chopped into uniform molding powder granules. These molding powder granules were then melt spun into (210 denier/35 filament) continuous filament yarns which were knit on a standard knitting machine into fabric specimens (28 cut, 24 course, 4½" diameter). Samples, approximately 4½" by 6", were cut from the specimens and the two raw edges overcast with cotton thread. The samples were then tested for home laundry durability by washing in a home type automatic washer using a normal cycle and low water level setting (11 gallons), a water temperature of about 160° F., and 1 cup of nonionic detergent and ¾ cup of hypochlorite bleach, and then dried for 45 minutes in a tumble dryer at 260 or 275° F. This wash-dry procedure was repeated until failure, at which time the fabric could be pulled apart with moderate finger pressure. The laundry durability is expressed as the number of wash-dry cycles completed before failure occurs. For the sake of comparison, a control composition was also prepared, fabricated, and evaluated as above with the exception that no hexakis(3,5 - di - tert-butyl-4-hydroxyphenoxy)cyclophosphazatriene or poly(dipentene disulfide) was used. Results of the tests are tabulated below in Table II.

TABLE II

| Example No. | Oven stability at 300° F., hrs. | Home laundry (cycles) dryer temperature | |
|---|---|---|---|
| | | 275° F. | 260° F. |
| 4 | 118 | 39 | 42 |
| 5 | 159 | 60 | 70 |
| Control | <1 | 6 | |

What I claim and desire to protect by Letters Patent is:

1. A phosphonitrilic compound of the formula

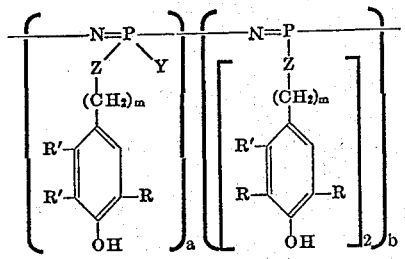

where R is an alkyl group containing 1 to 20 carbon atoms; one R' is hydrogen and the other R' is an alkyl group containing 1 to 20 carbon atoms; Z is selected from the group consisting of —O—, —S—, —NH—, and —NR"— and Y is selected from the group consisting of halogen, R"S—, —NH2, R"NH—, and R"2N— where R" is a univalent hydrocarbon radical containing 1 to 20 carbon atoms and is selected from the group consisting of alkyl, cyclohexyl, phenyl, alkylphenyl and phenylalkyl radicals; $m$ is 0 or 1; $a$ is 0 to 10; $b$ is 0 to 10; and the sum of $a+b$ is a number from 3 to 10.

2. The phosphonitrilic compound of claim 1 wherein Z is —O—, $m$ is 0, $a$ is 0, and $b$ is 3.

3. The phosphonitrilic compound of claim 2 wherein R and the R' ortho to the hydroxyl group are tert-butyl groups.

References Cited

UNITED STATES PATENTS 3,260,685  7/1966  Rice et al.
3,280,223  10/1966  Kober et al.

CHARLES B. PARKER, *Primary Examiner.*

R. L. RAYMOND, *Assistant Examiner.*

U.S. Cl. X.R.

252—402, 403; 260—2, 45.95, 551, 570.9, 575, 609, 619, 624